(12) United States Patent
Servera Serapio et al.

(10) Patent No.: US 7,489,234 B2
(45) Date of Patent: *Feb. 10, 2009

(54) SYSTEM AND METHOD FOR THE MAGNETIC DETECTION OF THE PRESENCE OF OBJECTS IN A BLIND ANGLE OF AN AUTOMOBILE VEHICLE

(75) Inventors: Llorenç Servera Serapio, Mollet Del Vallès (ES); Francesc Daura Luna, Sant Quirze Del Vallès (ES)

(73) Assignee: Fico Mirrors, S.A., Barcelona (ES)

( * ) Notice: Subject to any disclaimer, the term of this patent is extended or adjusted under 35 U.S.C. 154(b) by 202 days.

This patent is subject to a terminal disclaimer.

(21) Appl. No.: 10/567,982

(22) PCT Filed: Aug. 18, 2003

(86) PCT No.: PCT/ES03/00428

§ 371 (c)(1),
(2), (4) Date: Aug. 28, 2006

(87) PCT Pub. No.: WO2005/017856

PCT Pub. Date: Feb. 24, 2005

(65) Prior Publication Data

US 2007/0139175 A1    Jun. 21, 2007

(51) Int. Cl.
*B60Q 1/00* (2006.01)
*G06F 17/10* (2006.01)
*G06G 7/78* (2006.01)
*G08G 1/16* (2006.01)

(52) U.S. Cl. .................. 340/435; 340/436; 701/301

(58) Field of Classification Search ................ 340/435, 340/436, 463–490; 701/36, 40, 300–302; 73/1.37, 1.38, 488, 514.01
See application file for complete search history.

(56) References Cited

U.S. PATENT DOCUMENTS 4,232,286 A    11/1980  Voll (Continued)

FOREIGN PATENT DOCUMENTS

EP    0 591 743 A1    4/1994

(Continued)

OTHER PUBLICATIONS

International Search Report for PCT International Application No. PCT/ES03/00428 mailed Dec. 17, 2003.

*Primary Examiner*—Benjamin C Lee
*Assistant Examiner*—Jennifer Mehmood
(74) *Attorney, Agent, or Firm*—RatnerPrestia

(57) ABSTRACT

A system and method for the magnetic detection of the presence of objects in a blind angle of an automobile vehicle is disclosed. The system includes a first detector of distortion of the earth's magnetic field caused by the entry of a ferromagnetic object into a blind angle, a second, a third and possibly a fourth detector of magnetic distortion deriving from the vehicle's trajectory, inclination and/or vibration and magnetic fields generated inside the actual vehicle, respectively, all associated with an electronic circuit. The method includes employing the proposed system to, through the generation of a table relating trajectory, inclination and/or vibrations or magnetic fields generated inside the vehicle with a corresponding distortion of the magnetic filed due to the specific circumstances, neutralize the effects of the possible magnetic distortion on the detection of the object.

18 Claims, 2 Drawing Sheets

U.S. PATENT DOCUMENTS

| | | | |
|---|---|---|---|
| 5,708,427 A * | 1/1998 | Bush | 340/941 |
| 5,979,581 A * | 11/1999 | Ravani et al. | 180/168 |
| 6,140,933 A | 10/2000 | Bugno et al. | |
| 6,236,915 B1 * | 5/2001 | Furukawa et al. | 701/25 |
| 7,146,740 B2 * | 12/2006 | Manfred | 33/356 |
| 2004/0246113 A1 * | 12/2004 | Strumolo et al. | 340/435 |

FOREIGN PATENT DOCUMENTS

| | | |
|---|---|---|
| ES | 2 164 568 | 2/2002 |
| GB | 2 130 729 A | 6/1984 |
| GB | 2 248 692 A | 4/1992 |
| WO | WO 02/093529 A1 | 11/2002 |

* cited by examiner

SYSTEM AND METHOD FOR THE MAGNETIC DETECTION OF THE PRESENCE OF OBJECTS IN A BLIND ANGLE OF AN AUTOMOBILE VEHICLE

This application is a U.S. National Phase Application of PCT International Application No. PCT/ES2003/000428, filed Aug. 18. 2003.

SCOPE OF THE INVENTION

This invention concerns a system and method for the magnetic detection of objects in a blind angle of an automobile vehicle. The system comprises some first means of detection of a distortion in the earth's magnetic field caused by the entry of a ferromagnetic object into the blind angle, in addition to at least some second means providing a detection of possible magnetic distortions designed to neutralise the influence of said possible magnetic distortion on the detection of the object.

BACKGROUND TO THE INVENTION

For some time now, it has been recognised that the simple use of rear-view mirrors to avoid collisions with vehicles that are attempting to overtake, or simply when they are changing lane, is clearly insufficient because of the existence of so-called blind angles of vision to which the driver does not have any direct or indirect visual access. For this reason various viewing alternatives to cover such blind angles have appeared based on different technologies, with the most representative relating to this invention, known to inventors covered by the following documents.

Patent application EP-A-0591743 described a device for the detection of relative positions between vehicles, by means of an optical sensor, preferably based on CCD technology, associated with a rear-view mirror casing, with said optical sensor associated with an electronic processing unit connected to a central information system in the vehicle, to which processed signals are sent, finally providing warning signals. The purpose of this device is to warn the driver of the vehicle in which it is installed of any possible risk of collision with another approaching vehicle via various signals (acoustic and luminous etc). There is also the possibility of using the cited device to warn the driver of the approaching vehicle of the possible risk of collision by switching on the vehicle's emergency or indicator lights. Although the proposal made in said document is very significant with respect to preventing collision with other vehicles, unlike that proposed by this invention, the employed system is based on the relative movement of said objects with respect to the vehicle in which the device is installed. Another disadvantage of the same is that the covered zone is not lateral, but instead to the rear, so that they detect objects that are moving within the zone on which the device is focused, which is generally installed in a rear-view mirror assembly, leaving a lateral zone of the vehicle that is neither visible to the driver nor covered by the device. In addition to this, the operation of this class of devices in low-visibility conditions (dazzling and fog etc) is clearly affected.

GB-A-2248692 proposes a MAD device for detecting the presence of a powerful magnet used to secure a bomb underneath a vehicle. Said proposal is based on the layout of a number of magnetic sensors underneath the vehicle, each of which provides an output in proportion to its respective magnetic field, which will vary when said bomb is attached to the vehicle by said powerful magnet, thus producing detection.

Patent application ES-A-2164568 proposes a detector for metal objects, particularly bombs, located in a vehicle, by analyzing variations in the magnetic filed caused in a circuit used as a detector by said object.

Although the last two cited background items propose the use of some means of detecting variations or distortions in the magnetic field produced by metal or magnetic objects (a bomb or its securing device) located inside or underneath a vehicle, it does not, at any time, mention the use of the same technique to detect vehicles in a blind angle of a vehicle, which are not visible to the driver of the same, neither directly nor via rear view mirrors, in order to avoid collisions between these during an overtaking or lane change operation.

Patent application WO-A-02/093529, belonging to the same applicant, describes a device for the detection of the presence of objects in a blind angle of a vehicle similar to the one proposed in this invention. Said objects contain, at least partly, ferromagnetic material which produces distortion in the earth's magnetic field. This device is mounted in an automobile vehicle with at least one blind angle and is able to detect an object located in the blind angle by employing some means of detecting distortion in the earth's magnetic field caused by the object. The invention further includes electronic and logic circuitry for processing and analyzing the electrical signals that are proportional to said magnetic field distortion obtained by the device, and based on the results of said analysis provide a warning to the vehicle's driver of any possible dangerous situation due to an invading object in the zone covered by the vehicle's blind angle, such as another vehicle attempting to overtake.

The solution proposed by patent WO-A-02/093529 represents a great advance in covering zones delimited by vehicle blind angles, above all when referring to the lateral zones of the same, with the proposed device being able to detect the same objects, whether moving or stationary and to differentiate them. This patent also suggests compensating the obtained measurements by means of said device, taking into account the influence of vehicle inclination, together with the distortion of the earth's magnetic field caused by the automobile vehicle itself. With respect to inclination, only the possibility of taking it into account when evaluating the detected values is indicated, and a device is claimed that measures the same, but at no time does it explain a method of implementation that uses the data obtained by the same device or how to compensate it for inclination. In relation to the internal vehicle distortions, it claims the fact of having calibration data that allows to discard from the signal produced by each magnetic sensor in the vehicle, the part corresponding to the distortion produced by the actual vehicle. However the method employed in obtaining these data, as described in the report (rotating the vehicle about its axis in the absence of any objects, to obtain values of the magnetic sensors installed in the vehicle), does not appear representative of all possible distortions of the earth's magnetic field that could be produced within the vehicle. One thing that is not considered at all in the document is the great influence that the trajectory adopted by the vehicle has on the earth's magnetic field, particularly during the route of a curve by the same, which will severely limit operation of the device proposed by the cited background if the vehicle is in the described situation within a curve.

It would therefore appear necessary to provide an alternative to the state of the art which, starting from patent WO-A-02/093529, substantially improves it and avoids the associated disadvantages because of a more realistic vision of the location in which the device is installed, the automobile vehicle. Such circumstances are not other than those of a moving object, having a trajectory and irregular behavior, not only due to the trajectory changes made by the driver, but also because of irregularities in the ground over which the vehicle is travelling that could include from significant ascending and descending slopes to varying sized potholes. This means a device that takes into account all errors that could be produced by the commented circumstances relating to distortion in the earth's magnetic field and, of course, compensate for them in the best possible fashion.

BRIEF DESCRIPTION OF THE INVENTION

This invention concerns a system and method for the magnetic detection of the presence of objects in a blind angle of an automobile vehicle. Said system is installed in an automobile vehicle, usually in a rear-view mirror assembly, and based on the concept of the earth's magnetic field being modified due to objects containing ferromagnetic material. For this reason and taking into account that automobile vehicles contain, at least in part, ferromagnetic material, the system comprises some first means of detection of distortion in the earth's magnetic field caused by the entry of an object such as a vehicle, containing at least one ferromagnetic material, into a zone of said blind angle covered by said first means of detection, which supplies electrical signals, on the basis of said magnetic field, to an electronic circuit containing a stage that digitises said signals, a stage that analyses the signals produced by this digitisation and a stage that generates some variable output signals on the basis of said analysis.

As was previously commented, this invention is designed to take into account the circumstances through which the vehicle passes in order to prevent any false measurements from producing deceptive results and which warn the driver of the vehicle in which the system is installed of, for example, a possible collision with a second vehicle that is supposedly overtaking, when, in actual fact, said second vehicle is located just behind the first, only that it is following the same curve as the first. The goal is therefore, to establish the distortions that produce, not only the route of said curve (and of any other), but also the passage of the vehicle over ground that is not flat and produce vibrations or inclinations in the same, and the magnetic fields produced inside the actual vehicle. To this end, the system is fitted with some second means of detection of possible magnetic distortion deriving from the trajectory of said automobile vehicle, together with some third means of detecting possible magnetic distortion deriving from the inclination and/or vehicle vibrations and some fourth means of detecting possible magnetic distortion caused by magnetic fields produced inside the actual vehicle, all associated with said electronic circuit and intended to neutralize the influence of said possible magnetic distortion on the detection of the first means.

This invention further proposes a method by means of which, and employing the above described system, the neutralization of the influence of possible magnetic distortion is put into practice, said distortion not being caused by the object to be detected, on the detection by the first means.

Said method comprises processing and analyzing the representative signals of possible magnetic distortion, storing the values of the earth's magnetic field distortion for each of them and producing a table from these values that relates the trajectory, inclination and/or vibrations or magnetic fields generated inside the vehicle with a corresponding distortion of the magnetic field. Based on this table and knowing the situation or circumstances the vehicle is passing through at any given moment, because of the commented means, the value or values of said table that are representative of said circumstances will be processed with the value obtained from the first means of detection, thus compensating all undesired magnetic distortion in the obtained final result which, if the main magnetic field suffers any variation, will be reliably indicative of another vehicle actually invading the zone covered by the blind angle of our vehicle in a dangerous manner.

BRIEF DESCRIPTION OF THE DRAWINGS

The previous and other characteristics of the invention will become clearer from the following description of an embodiment example that is illustrated by the attached drawings, which should be taken as non-limiting guidelines.

An embodiment example is described below with reference to the attached drawings, in which.

DETAILED DESCRIPTION OF AN EMBODIMENT EXAMPLE

In accordance with a preferred embodiment example, the detection system proposed by this invention is used to detect the presence of objects in a blind angle of an automobile vehicle and which is installed in an automobile vehicle, usually in a rear-view mirror assembly outside the vehicle, although it could be installed in any other part of the vehicle, for example, the rear of the vehicle, depending on the required radius of operation for the detector.

Figure 1:
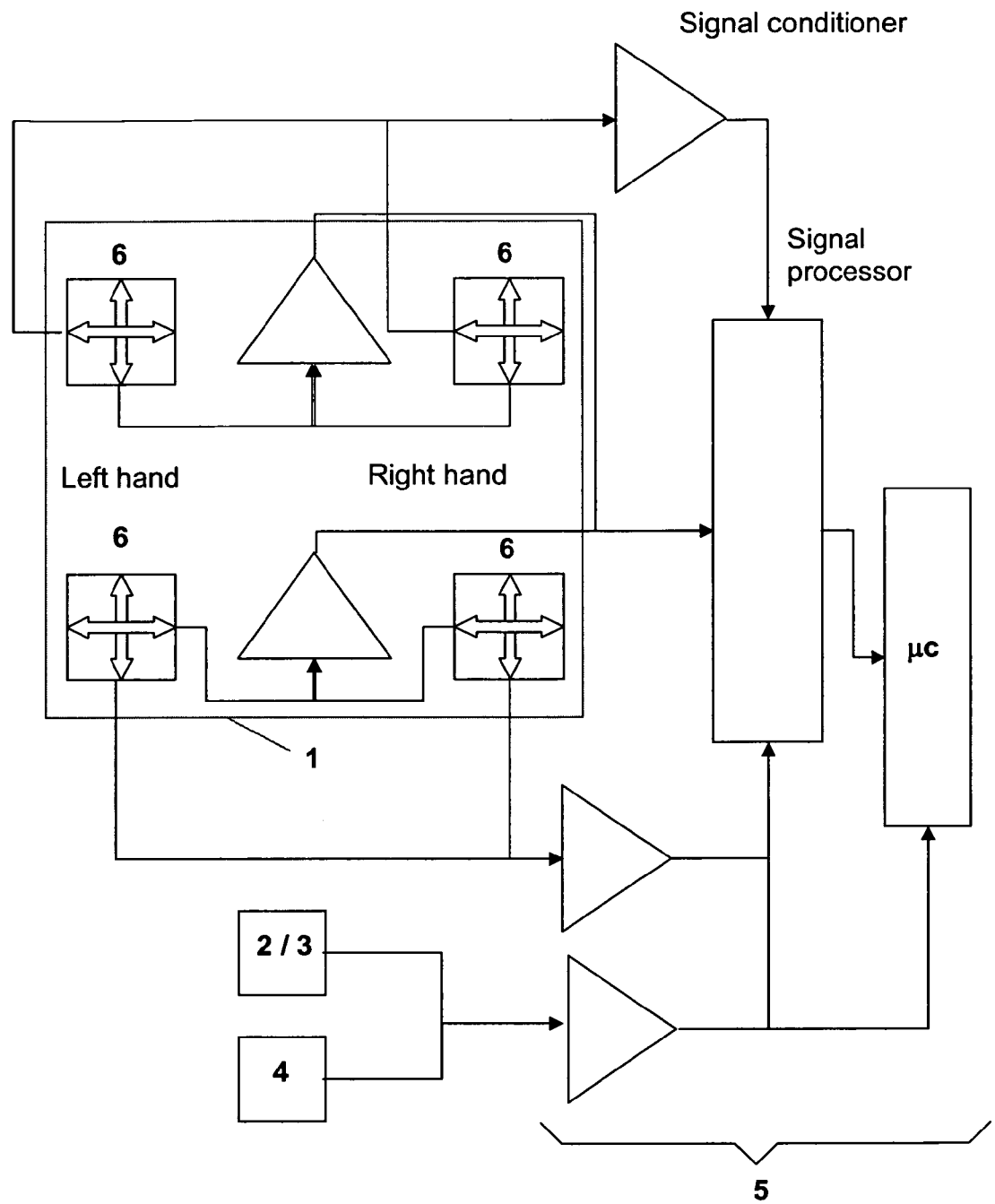
FIG. 1 shows the system proposed by this invention on a schematic level for an embodiment example.

The system comprises some first means of detection 1 in the form of at least one magnetic sensor 6, housed inside a rear-view mirror assembly outside the vehicle, there being four in one preferred embodiment example, two in each rear-view mirror assembly on the driver's side and the passenger's side (see FIG. 1). Said first means of detection 1 detect distortion of the earth's magnetic field caused by the entry of an object, containing at least one ferromagnetic material, into a zone in said blind angle covered by the first means of detection 1, with said object usually being a second automobile vehicle that invades said zone producing a potentially dangerous situation. The modification of the earth's magnetic field caused by the object is captured by the mentioned magnetic sensors 6, which are responsible for converting said modification into corresponding electrical signals, which are sent by wire to an electronic circuit 5 located inside the vehicle and which comprises a digitisation stage of said signals, an analysis stage for the signals obtained from said digitisation and a stage that produces some variable output signals on the basis of the results of said analysis, which may be used to warn the driver of the presence of an object in the blind angle of the same, by means of warning luminous and acoustic signals etc, or even in a more active manner to prevent any sudden response, for example by making the steering wheel vibrate during this situation, or making it difficult for the occupants to exit the vehicle by partially blocking the doors or indicating which door is best to use to exit to avoid a dangerous situation and prevent being run-over.

To improve its effectiveness and avoid disturbances to the occupants caused by false detections, the proposed system is further fitted with some second means of detection 2 of possible magnetic distortion deriving from the trajectory of said automobile vehicle, together with some third means of detecting 3 possible magnetic distortion deriving from the inclination and/or vehicle vibrations and some fourth means of detecting 4 possible magnetic distortion caused by magnetic fields produced inside the actual vehicle, all associated with said electronic circuit 5 and intended to neutralize the influence of said possible magnetic distortion on the detection of the first means 1. In other words, a series of detection means designed to detect all distortion of the earth's magnetic field apart from those produced by the entry of the second vehicle into the blind angle of the vehicle in which the system is installed in order to subsequently take them into account and hence relate the measurements obtained by the first means of detection 1, in other words differentiate with the distortion of the earth's magnetic field is actually caused by the entry of an object containing ferromagnetic material into the zone covered by the magnetic sensors 6 of the first means of detection 1, in other words, in the vehicle's blind angle.

Figure 2:
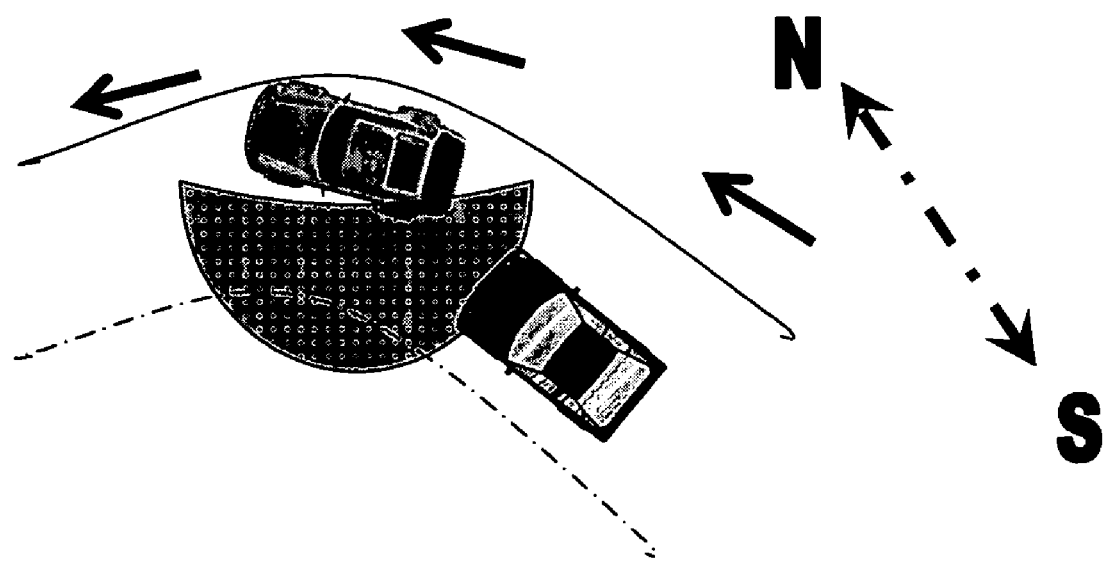
FIG. 2 shows a real driving situation with the vehicle following a curve.

FIG. 2 shows one of the situations in which it is necessary to compensate the detection made by the first means of detection 1 in order to avoid false measurements. It shows how the vehicle, in which the system of this invention is installed, is following a curve and how, in this situation, another vehicle, which is circulating just behind, but not attempting to overtake, enters the zone covered by the first means of detection 1, which, without the second means of trajectory detection 2, would be interpreted as a potentially dangerous situation of false overtaking when, in fact, it is a normal circulation situation.

FIG. 1 schematically shows all the parts belonging to the above detailed system. Specifically, the embodiment example of said figure includes four magnetic sensors 6, two in each of the outside rear-view mirrors, belonging to the first means of detection 1. This also shows the second 2 and third 3 means of detection, in a single block since, as it will be explained later, there are sensors that can perform the two types of detection to be carried out by the second 2 and third 3 means of detection. The fourth means of detection 4 can also be seen schematically, together with the electronic circuit 5 which, as shown in the figure, basically comprises a signal conditioner, a signal processor and a microcontroller, although it is obvious that it is merely an example for illustrative purposes and not representative.

Several different embodiment examples have been proposed to establish the vehicle's path, depending on how the information relating to said trajectory is obtained. In a first embodiment example, the second means of detection 2, comprise at least one accelerometer or centripetal acceleration sensor, which measures the centripetal acceleration of the same, with the sensor providing the electronic circuit 5 with an electric signal that is proportional to said centripetal acceleration, which permits the electronic circuit 5, which can be part of the vehicle's central control, such as an onboard computer, and which can also have access to information on the vehicle's linear speed, to obtain, at any given time, and by means of both parameters, the vehicle's angular speed and the radius of curvature, since when turning is produced it produces a centripetal acceleration that is inversely proportional to the radius of curvature and proportional to the square of the linear speed.

Said radius of curvature can also be obtained in other ways, such as that proposed in another embodiment example, in which the accelerometer of the previous embodiment example is replaced here by some means of data acquisition employing a turning sensing pulse system comprising two sensors each of which is located in each of the two rear wheels of the vehicle. Said sensors provide electric signals in the form of pulses to the electronic circuit 5, proportional to the turning of each wheel, and which will be different in the case of one wheel rotating more than the other, in other words, when the vehicle is turning. The difference between the number of pulses between one wheel and the other is taken into account by the electronic circuit 5 so that, in the same way as in the case that employs an accelerometer as a sensor, a series of values of radii of curvature is obtained, corresponding to the various trajectories adopted by the vehicle, more specifically to the various classes of curves, in addition to knowing when the car is actually turning and any undesired distortion in the earth's magnetic field that is consequently being produced.

In another embodiment example, the information on the vehicle's radius of curvature is obtained by means of a turning detection device located on the vehicle's steering wheel that is part of the second means of detection 2. The processing performed on this information is the same as that already explained for the two embodiment examples described above.

Although the greatest influence with respect to undesired distortion of the earth's magnetic field comes from the vehicle's trajectory, specifically its curves, there are other sources that cause distortion of the magnetic field that are intended to be taken into account by this invention to avoid false detections. One of these is vehicle inclination and/or vibration, which can be quite significant, especially on mountain roads. For this reason, the cited third means of detection 3 of possible magnetic distortion deriving from vehicle inclination and/or vibration are incorporated into the system. In a preferred embodiment example, the third means of detection 3 comprise at least one 2-axis accelerometer, which can be used, not only to measure vehicle inclination, but also its trajectory, which means that, in fact, the 2-axis accelerometer will replace that used by the first means of detection 1 and will be part of both the first 1 and second 2 means of detection.

As has already been stated, the system proposed by this invention, so that the detection of potential danger situations is even more exact, also includes some fourth means of detection 4 of possible magnetic distortion, in this case, that produced by magnetic fields generated inside the actual vehicle. In turn, said fourth means of detection 4 comprise two magnetic field sensors located inside the vehicle and connected in common mode, installed apart and positioned so that they generate very similar output signals when one of said magnetic fields is produced inside the vehicle, signals that are sent by the corresponding wiring to the electronic circuit 5, which processes and analyses them in order to identify the various distortions of the earth's magnetic field caused by the different elements inside the vehicle, such as air-conditioning units, lights, (especially brake lights) etc, and any other electric device installed inside the vehicle and, as stated, take them into account to neutralize their influence on the operation of the first means of detection 1.

Because of their excellent value for money all the magnetic sensors belonging to the proposed system in a preferred embodiment example are magnetoresistive sensors, although obviously, the use of other types of magnetic sensors is not ruled out, such as flux-gate magnetometers, hall type sensors and magneto-inductive sensors.

Known magnetic sensors usually have a range of some four meters so that, as previously indicated for a preferred embodiment example, they are installed in an outside rear-view mirror assembly, with the zone covered by each one having a semicircular shape with an approximate radius of four meters with the centre at the rear-view mirror. For this reason, the possibility is left open of combining the system proposed by this invention with other having greater range, such as those employing optical sensors in order to detect objects at greater distances, including outside the vehicle's blind angle.

This invention also proposes a method of detecting the presence of objects in the blind angle of an automobile vehicle, which uses the proposed system to neutralize the influence of any possible magnetic distortion on the operation of the first means of detection 1.

The method comprises employing the already described first means of detection 1 and an electronic system, being the system's electronic circuit 5 part thereof, to detect the entry of an object containing ferromagnetic material into the zone covered by the blind angle of the vehicle, obtaining signals that are representative of said detection, the processing and analysis of said signals and the generation of variable output signals on the basis of said analysis. It also comprises using said electronic system and the already described second 2, third 3 and fourth means of detection 4 to detect any possible magnetic distortion deriving from the trajectory, the inclination and/or vibration of said automobile vehicle and the magnetic fields generated inside the actual vehicle respectively and the processing and analysis of signals that are representative of said possible magnetic distortion in order to neutralize their effects on the detection obtained by the first means of detection 1.

With each of said representative signals of the possible magnetic distortion apart from those detected by the first means of detection 1 and after said processing and analysis to which they are subjected to by said electronic system, the method comprises the storage, by said electronic system, of certain values of distortion of the earth's magnetic field, each of which represents a determined circumstance through which the vehicle is continually passing so that said values form a table that relates trajectory, inclination and/or vibration or magnetic fields generated inside the vehicle with a corresponding distortion of the magnetic field due to the specific circumstances. Once said table has been produced, which can be carried out in a prior calibration stage, with the vehicle subjected to all types of tests for all possible circumstances, the same is stored in a memory being part of or accessible to the electronic system. Using said table as reference, when in a real driving situation in which the vehicle is passing through any of the contemplated circumstances, for example, when it is following a curve with a determined radius, the electronic system will be aware of this because the second 2, third 3 and fourth 4 means of detection already described in the system used by this method (accelerometer or magnetic sensors in common mode, for example), inform the electronic system that said circumstance is occurring and the same is responsible for calculating, as previously described with the system, a variable value that is characteristic of said circumstance, such as the radius of curvature in the case of a curve. Once said value is established, for example, the radius of curvature, the system will consult the table and select the corresponding distortion value of the earth's magnetic field. With said distortion value, the electronic system will operate employing the distortion value of the earth's magnetic field using the first means of detection 1 for this same instant. For a preferred embodiment example, said operation will comprise simply subtracting the undesired distortion value of the earth's magnetic field from that obtained by the magnetic sensors 6 belonging to the first means of detection 1. The process to follow will be identical for the rest of the possible circumstances, simply changing the variable to be consulted in the table, for example, by the degree of inclination for the case of distortion caused by the inclination and/or vibration instead of the radius of curvature.

A person skilled in the art would be able to introduce changes and modifications in the described embodiment example, without leaving the scope of the invention in accordance with that defined in the attached claims.

The invention claimed is:

1. A system for the detection of the presence of objects in a blind angle of an automobile vehicle, installed in an automobile vehicle and comprising:
   first means of detection of distortion of the earth's magnetic field caused by the entry of an object, containing at least one ferromagnetic material piece, in a zone of said blind angle covered by said first means of detection that supplies electric signals, on the basis of the strength of said magnetic field, to an electronic circuit with a digitizing stage for said signals,
   a second stage that analyses the signals obtained after said digitizing;
   a first stage that generates variable output signals based on said analysis; and
   second means of detection for possible magnetic distortion generated from a trajectory of said automobile vehicle, associated with said electronic circuit and intended to neutralize an influence of said possible magnetic distortion on the detection of said first means.

2. A detection system in accordance with claim 1, further comprising third means of detection of the possible magnetic distortion deriving from the vehicle's inclination and/or vibration, associated with the electronic circuit.

3. A detection system in accordance with claim 1, further comprising fourth means of detection of the possible magnetic distortion deriving from magnetic fields generated within the vehicle, associated with the electronic circuit.

4. A detection system in accordance with claim 1, wherein said second means of detection comprises at least one accelerometer.

5. A detection system in accordance with claim 1, wherein said second means of detection comprises at least means of data acquisition employing a turning sensing pulse system located at least on one of the vehicle's wheels.

6. A detection system in accordance with claim 1, wherein said second means of detection comprises at least one turning detection device located on the vehicle's steering wheel.

7. A detection system in accordance with claim 2, wherein said second means of detection and said third means of detection comprises at least one 2-axis accelerometer.

8. A detection system in accordance with claim 3, wherein said fourth means of detection comprises at least two magnetic field sensors located inside the vehicle, connected in common mode, distanced from each other and positioned in such a manner that they generate very similar output signals when one of said magnetic fields is produced inside the vehicle.

9. A detection system in accordance with claim 1, wherein said first means of detection comprises at least one magnetic sensor housed inside a rear-view mirror assembly outside the vehicle.

10. A detection system in accordance with claim 8, wherein said sensors are magnetoresistive.

11. A detection system in accordance with claim 8, wherein said sensors are selected from the group consisting of fluxgate magnetometers, hall type sensors and magneto-inductive sensors.

12. A method of detection of the presence of objects in a blind angle of an automobile vehicle based on the use of first means of detection of distortion in the earth's magnetic field caused by the entry of an object, which contains at least one ferromagnetic material, in a zone of said blind angle covered by said first means of detection and an electronic system, comprising:

carrying out the detection of the entry of said object into said zone of said blind angle, obtaining signals that represent said detection, processing and analyzing of said signals, generating of some variable output signals based on said analysis, carrying out, by means of said electronic system and at least some second means of detection, the detection of possible magnetic distortion deriving from a trajectory of said automobile vehicle, and processing and analyzing of signals that are representative of said possible magnetic distortion deriving from the automobile vehicle's trajectory, in order to neutralize its effect on the detection obtained by the first means of detections.

13. A method of detection in accordance with claim 12, further comprising carrying out, using said electronic system and at least third means of detection of possible magnetic distortion deriving from the inclination and/or vibration of the automobile vehicle, the processing and analysis of signals representative of said possible magnetic distortion deriving from the inclination and/or vibration of the automobile vehicle in order to neutralize their effect on the detection obtained by the first means of detection.

14. A method of detection in accordance with claim 13, further comprising carrying out, by means of said electronic system and a fourth means of detection of possible magnetic distortions produced by magnetic fields generated inside the vehicle itself, the processing and analysis of signals representative of said possible magnetic distortions produced by magnetic fields generated inside the vehicle itself in order to neutralize its effect on the detection obtained by the first means of detection.

15. A method of detection in accordance with claim 14, wherein for each of the possible trajectories adopted by the vehicle and/or of the possible positions of inclination and/or vibration of the vehicle and/or of the magnetic fields generated inside the vehicle itself, after said processing and analysis of the signals representative of the possible magnetic distortions, it comprises the storing, by means of the electronic system, of distortion values of the earth's magnetic field, with these values forming a table that relates trajectory, inclination and/or vibration or magnetic fields generated inside the vehicle with a corresponding distortion value of the magnetic field.

16. A method of detection in accordance with claim 15, wherein at least one of said values, representative of the vehicle's circumstances at a point in time, with said circumstances being known through the second, third and fourth means of detection, is operated with the distortion value of the earth's magnetic field obtained by the first means of detection for this same point in time.

17. A detection system in accordance with claim 9, wherein said sensors are magnetoresistive.

18. A detection system in accordance with claim 9, wherein said sensors are selected from the group consisting of flux-gate magnetometers, hall type sensors and magneto-inductive sensors.

* * * * *